US011958766B2

(12) United States Patent
Guan et al.

(10) Patent No.: US 11,958,766 B2
(45) Date of Patent: Apr. 16, 2024

(54) RECYCLING TREATMENT EQUIPMENT FOR RECYCLING HEAVY METALS FROM COMPLEXED HEAVY METAL WASTEWATER

(71) Applicants: Chongqing Jiaotong University, Chongqing (CN); Chongqing Ecological Environment Monitoring Center, Chongqing (CN); Chongqing Environment Science Research Institute, Chongqing (CN); Chongqing University of Arts and Sciences, Chongqing (CN)

(72) Inventors: Wei Guan, Chongqing (CN); Xiaotian Zhang, Chongqing (CN); Dan Song, Chongqing (CN); Yong Zhang, Chongqing (CN); Zhigang Xie, Chongqing (CN)

(73) Assignees: Chongqing Jiaotong University, Chongqing (CN); Chongqing Ecological Environment Monitoring Center, Chongqing (CN); Chongqing Environment Science Research Institute, Chongqing (CN); Chongqing University Of Arts And Sciences, Chongqing (CN)

( * ) Notice: Subject to any disclaimer, the term of this patent is extended or adjusted under 35 U.S.C. 154(b) by 0 days.

(21) Appl. No.: 18/353,070

(22) Filed: Jul. 15, 2023

(65) Prior Publication Data

US 2024/0025786 A1    Jan. 25, 2024

(30) Foreign Application Priority Data

Jul. 19, 2022    (CN) .......................... 202210851516.1

(51) Int. Cl.
*C02F 9/00*    (2023.01)
*C02F 1/44*    (2023.01)
(Continued)

(52) U.S. Cl.
CPC ................ *C02F 9/00* (2013.01); *C02F 1/441* (2013.01); *C02F 1/442* (2013.01); *C02F 1/444* (2013.01);
(Continued)

(58) Field of Classification Search
None
See application file for complete search history.

(56) References Cited

FOREIGN PATENT DOCUMENTS

| CN | 104386860 B | 8/2016 |
| CN | 105819560 A | 8/2016 |

(Continued)

OTHER PUBLICATIONS

Search Report, issued in CN202210851516.1 (priority application), by CNIPA, dated Jul. 5, 2023.
(Continued)

*Primary Examiner* — Chester T Barry
(74) *Attorney, Agent, or Firm* — Zhu Lehnhoff LLP

(57) ABSTRACT

The present disclosure discloses recycling treatment equipment for recycling heavy metals from complexed heavy metal wastewater, and belongs to the technical field of wastewater treatment. The recycling treatment equipment includes a wastewater separation and concentration component, an oxidization and decomplexing component, an electrolytic recovery component, and an intelligent detection component. Wastewater containing complexed heavy metals is divided into fresh water and concentrated water by performing microfiltration, nanofiltration, and reverse osmosis purification pretreatment, and the fresh water is then recycled in a targeted manner, so that the equipment has energy conservation and discharge reduction effects, can decomplex and recycle heavy metals in the concentrated water, and also synchronously purifies the fresh water. The whole process has the advantages of simple operation, zero sludge, and low treatment cost, so that the equipment is suitable for being greatly promoted.

9 Claims, 6 Drawing Sheets

(51) Int. Cl.
*C02F 1/461* (2023.01)
*C02F 1/72* (2023.01)
*C02F 101/20* (2006.01)

(52) U.S. Cl.
CPC .......... *C02F 1/46109* (2013.01); *C02F 1/725* (2013.01); *C02F 2101/20* (2013.01)

(56) References Cited

FOREIGN PATENT DOCUMENTS

| CN | 107440136 A | 12/2017 |
|---|---|---|
| CN | 111573956 A | 8/2020 |
| CN | 111847626 A | 10/2020 |
| CN | 111977751 A | 11/2020 |
| CN | 212403577 U | 1/2021 |
| CN | 108178370 B | 2/2021 |
| CN | 112299615 A | 2/2021 |
| CN | 111018203 B | 2/2022 |

OTHER PUBLICATIONS

Search Report, issued by Zhanqiao Patent Agency, dated Jul. 19, 2022.
Experimental study on treatment of complexed copper-nickel electroplating wastewater by electrofenton process, by Wu Yang, issued in Chinese Excellent Master's Dissertation Full text Database Engineering Science and Technology Series I, issue 2, dated Feb. 15, 2018.
The treatment of electroplating wastewater using an integrated approach of interior microelectrolysis and Fenton combined with recycle ferrite, by Lei Wang and others, issued in Chemosphere, vol. 286, dated Jul. 31, 2021.
Notice of Grant of Patent Right, issued in CN202210851516.1 (priority application), by CNIPA, dated Jul. 5, 2023.
First Examination Report, issued in CN202210851516.1 (priority application), by CNIPA, dated Jul. 5, 2023.

RECYCLING TREATMENT EQUIPMENT FOR RECYCLING HEAVY METALS FROM COMPLEXED HEAVY METAL WASTEWATER

REFERENCE TO RELATED APPLICATIONS

The present application claims the priority of Chinese patent application No. 202210851516.1, filed on 2022 Jul. 19, the entire disclose of which is incorporated herein by reference.

TECHNICAL FIELD

The present disclosure belongs to the technical field of sewage treatment, and more particularly, to recycling treatment equipment for recycling heavy metals from complexed heavy metal wastewater.

BACKGROUND

Complexed heavy metal wastewater comes from a wide range of sources, and complexed heavy metal pollution in an environment is mainly from industrial wastewater discharge. Industrial wastewater containing a large number of complexed heavy metals mainly includes wastewater discharged from the metal smelting industry, the printed circuit board industry, the printing and dyeing industry, the paper-making industry, the electroplating industry, and the like. After free metal ions in the industrial wastewater are discharged into water, the free metal ions would be combined with $OH^-$, $Cl^-$, $SO_4^{2-}$, $NH^{4+}$, organic acids, amino acids, humic acids, fulvic acids, and the like in natural water to generate various complexes or chelates.

Heavy metals existing in the form of free ions can be basically removed by alkali precipitation, but for complexed heavy metals, due to a strong binding ability between the heavy metal ions and a ligand of a complexing agent, it is difficult to meet the national comprehensive discharge standard using an ordinary alkali precipitation method. Compared with the free heavy metal ions, the complexed heavy metals no longer exist in the form of single heavy metal ions, but the complexed heavy metals form stable complexes with EDTA, tartaric acid, citric acid, NH3, and other substances, so they are more difficult to remove. It is difficult to achieve a satisfactory treatment effect by using the ordinary alkali neutralization and precipitation method. Therefore, there is an urgent need for recycling treatment equipment for recycling heavy metals from complexed heavy metal wastewater.

The existing equipment for recycling heavy metals from complexed heavy metal wastewater has the following defects; The equipment cannot purify and decomplex wastewater in a targeted manner, which greatly increases the wastewater treatment capacity and reduces the working efficiency. At the same time, adding reagents during oxidation and decomplexing easily causes accumulation to reduce the decomplexing effect. In electrolytic reduction, the electrolysis time is long, and the heavy metal recycling rate is low.

SUMMARY

For the problems above, the present disclosure provides recycling treatment equipment for recycling heavy metals from complexed heavy metal wastewater.

The technical solution of the present disclosure is as follows: recycling treatment equipment for recycling heavy metals from complexed heavy metal wastewater includes a wastewater separation and concentration component, an oxidization and decomplexing component, an electrolytic recovery component, and an intelligent detection component, wherein the wastewater separation and concentration component includes a microfiltration treatment device for performing microfiltration on the complexed heavy metal wastewater, a nanofiltration treatment device for performing nanofiltration on concentrated water treated by the microfiltration treatment device, a reverse osmosis water purifier for performing reverse osmosis purification on concentrated water treated by the nanofiltration treatment device, and a fresh water collection treatment device for purifying fresh water treated by the microfiltration treatment device, the nanofiltration treatment device, and the reverse osmosis water purifier;

the oxidization and decomplexing component includes a decomplexing cavity communicated with the fresh water collection treatment device, and a mixing cavity communicated with the decomplexing cavity; the mixing cavity is internally provided with a reaction plate; a plurality of mounting openings are uniformly formed in a side wall of the reaction plate; each of the mounting openings is filled with a filler bag; a curved swing plate is arranged at a position, opposite to the reaction plate, in the mixing cavity; the curved swing plate is connected with an oxidant box through a first extraction pump; a plurality of spraying holes are formed in a side wall, opposite the reaction plate, on the curved swing plate; an actuating frame for controlling the curved swing plate to swing left and right is arranged at a bottom end of the curved swing plate;

the electrolytic recovery component includes an electrode mounting barrel arranged vertically in the decomplexing cavity, positive electrode plates and negative electrode plates which are arranged on the electrode mounting barrel, and a direct current power supply electrically connected to the respective positive electrode plates and the respective negative electrode plates; each of the negative electrode plates includes an inner-layer electrode plate and an inner-layer electrode plate protective shell covered on an outer wall of the inner-layer electrode plate; a carbon-based reduction patch is arranged on an outer wall of the inner-layer electrode plate protective shell; the intelligent detection component includes a controller electrically connected to the microfiltration treatment device, the nanofiltration treatment device, the fresh water collection treatment device, the first extraction pump, the positive electrode plates, and the negative electrode plates, and a water quality detector used for detecting water quality in the fresh water collection treatment device.

According to one aspect of the present disclosure, the actuating frame includes a fixed plate arranged at an inner bottom end of the mixing cavity, a mounting seat arranged horizontally at an upper end of the fixed plate, a rotating shaft arranged horizontally at an upper end of the mounting seat, a mounting ring sleeving an outer wall of the rotating shaft and connected to a bottom end of the curved swing plate through a V-shaped frame, and a clockwise and anticlockwise rotation motor for driving the rotating shaft to rotate. When the clockwise and anticlockwise rotation motor drives the curved swing plate to swing left and right, an oxidant can be sprayed onto the reaction plate through the various spraying holes. At this time, the oxidant fully contacts and reacts with the filler bag on the outer wall of the reaction plate to generate a sulfate radical with high oxidability, which can attack complexed metals, causing complexes to be oxidized and degraded, breaking the complexed states of the complexes, and achieving the decomplexing purpose.

According to one aspect of the present disclosure, there are a plurality of the reaction plates; the plurality of reaction plates are spliced in sequence into an arc-shaped structure; a plurality of through holes are uniformly formed in an outer wall of each of the reaction plates; and a cross section of each of the through holes is of an isosceles trapezoid structure. The plurality of reaction plates are spliced into the arc-shaped structure, which can enlarge a contact area between the oxidant in the decomplexing cavity and the reaction plates and improve the efficiency of generating the sulfate radical with high oxidability, thereby improving the decomplexing effect.

According to one aspect of the present disclosure, a filler in the filler bag is ceramsite loaded with transition metals, and an oxidant in the oxidant box is liquid persulfate.

According to one aspect of the present disclosure, there are a plurality of the positive electrode plates; the plurality of the positive electrode plates are uniformly arranged circumferentially on the outer wall of the electrode mounting barrel; there are a plurality of the negative electrode plates; and the plurality of negative electrode plates are staggered from the plurality of positive electrode plates. Due to the arrangement of the plurality of positive electrode plates and the plurality of negative electrode plates, it is equivalent that a plurality of electrolysis processes are performed simultaneously, which shortens the electrolysis time and greatly improves the efficiency of recycling heavy metals.

According to one aspect of the present disclosure, a plurality of barrier strips in grid distribution are arranged on the outer wall of the inner-layer electrode plate protective shell; there are a plurality of carbon-based reduction patches; and the plurality of carbon-based reduction patches are distributed in the above grid region. It is convenient to disperse precipitates, which are obtained by reducing the heavy metals outside the inner-layer electrode plate protective shell, as small blocks.

According to one aspect of the present disclosure, a liquid spraying component is arranged at an upper end of the electrode mounting barrel; the liquid spraying component includes a plugging rod with a bottom end plugged into the electrode mounting barrel, an adjustment sleeve arranged at a top end of the plugging rod and capable of sliding up and down along an outer wall of the plugging rod, a spraying plate distributed circumferentially on an outer wall of the adjustment sleeve and having one end hinged to the outer wall of the adjustment sleeve, and a plurality of first electric telescopic rods arranged between the adjustment sleeve and the spraying plate; the respective spraying plates are connected to the mixing cavity through connecting pipes, and second extraction pumps are arranged at joints; and a plurality of spraying openings are uniformly formed in a bottom end of each of the spraying plates. Due to the arrangement of the spraying plates, the reacted oxidant liquid in the mixing cavity is sprayed between the adjacent positive electrode plates and negative electrode plates to avoid local accumulation and increase the electrolytic reaction rate. Meanwhile, the first electric telescopic rods extend and contract to adjust spraying angles and spraying ranges of the respective spraying plates. The spraying angles and spraying ranges of the respective spraying plates are adjusted to uniformly spray the reacted oxidant liquid with different contents, which ensures the thoroughness of the electrolytic reaction and increases the recycling rate of the heavy metals.

According to one aspect of the present disclosure, the spraying plates are located between the adjacent positive electrode plates and negative electrode plates; vertical sliding chutes in one-to-one correspondence to the spraying plates are arranged on the outer wall of the electrode mounting barrel; a plurality of T-shaped clamping columns capable of sliding up and down along the vertical sliding chutes are arranged on the outer wall of the adjustment sleeve; and a second electric telescopic rod connected to the bottom end of the plugging rod is arranged in the electrode mounting barrel. Since the second electric telescopic rod drives the plugging rod to slide up and down in the electrode mounting barrel, the spraying plates also synchronously slide. In the above process, the spraying plates spray the reacted oxidant liquid at different depths into sewage, so that the reacted oxidant liquid fully contacts the sewage to increase the amount of recycled heavy metals in the sewage.

According to one aspect of the present disclosure, a vertical stirring roller is arranged at the bottom end of each of the spraying plates, and a top of the vertical stirring roller is connected to a micro motor. The micro motor drives the vertical stirring rollers to perform stirring to improve the mixing uniformity of the reacted oxidant liquid and the sewage, which further improves the effect of recycling heavy metals.

The present disclosure further discloses a recycling treatment method for recycling heavy metals from complexed heavy metal wastewater. Based on the above recycling treatment equipment for recycling the heavy metals from the complexed heavy metal wastewater, the method specifically includes the following steps:

S1, feeding wastewater containing complexed heavy metals into the microfiltration treatment device for microfiltration to obtain primary fresh water and primary concentrated water; then feeding the obtained fresh water into the nanofiltration treatment device for nanofiltration to separate secondary fresh water and secondary concentrated water; feeding the obtained secondary fresh water into the reverse osmosis water purifier for purification to obtain tertiary fresh water and tertiary concentrated water; finally feeding the tertiary fresh water into the fresh water collection treatment device, and detecting the water quality of the purified water through the water quality detector; recycling the purified water after it is detected that the water quality meets a treatment standard; feeding the above primary concentrated water, secondary concentrated water and tertiary concentrated water into the decomplexing cavity;

S2, controlling the first extraction pump to be started through the controller, pumping the oxidant in the oxidant box into the curved swing plate, driving the rotating shaft to rotate alternately clockwise and anticlockwise through the clockwise and anticlockwise rotation motor to drive the curved swing plate to rotate in various angles along the reaction plates and spray the oxidant to the reaction plates via the various spraying holes, so that the oxidant fully contacts and reacts with the filler bags on the outer walls of the reaction plates to generate liquid containing sulfate radicals with high oxidability, wherein the liquid is accumulated in the mixing cavity:

S3, when the wastewater in the decomplexing cavity needs to be treated, pumping the liquid containing the sulfate radicals with high oxidability in the mixing cavity into the various spraying plates through the second extraction pumps, and uniformly spraying the liquid into the wastewater via the respective spraying openings, so that metal ions are dissociated from a complexed state; meanwhile, powering on the respective positive electrode plates and the negative electrode plates through the direct current power supply, wherein the carbon-based reduction patches are arranged on the outer wall of the inner-layer electrode plate protective shell, the metal ions dissociated from the complexed state are reduced on the negative electrode plates and deposited on the negative electrode plates; after the metal ions in the solution are completely recycled, hydrogen ions in the water are reduced into hydrogen and separated out; oxidation reaction occurs on the positive electrode plates to generate tiny bubbles; and S4, in the above process, adjusting the spraying angles and spraying ranges of the respective spraying plates by extension and contraction of the first electric telescopic rods, driving the plugging rods to slide up and down in the electrode mounting barrel through the second electric telescopic rod, which enables the spraying plates to synchronously slide, to adjust spraying depths of the spraying plates, and driving the vertical stirring rollers to perform stirring through the micro motor to improve the mixing uniformity of the reacted oxidant liquid and the sewage.

Compared with the prior art, the present disclosure has the beneficial effects as follows.

(1) The present disclosure provides the recycling treatment equipment for recycling the heavy metals from the complexed heavy metal wastewater, wastewater containing complexed heavy metals is divided into fresh water and concentrated water by performing microfiltration, nanofiltration, and reverse osmosis purification pretreatment, and the fresh water is then recycled in a targeted manner, so that the equipment has energy conservation and discharge reduction effects, can decomplex and recycle heavy metals in the concentrated water. By the above pretreatment manner, the sewage treatment volume during recycling of heavy metals is greatly reduced, and the efficiency of recycling heavy metals is improved. Furthermore, the equipment synchronously purifies the fresh water while performing decomplexing and oxidization to recycle the heavy metals, which greatly improves the working efficiency. The whole process has the advantages of simple operation, zero sludge, and low treatment cost, so that the equipment is suitable for being greatly promoted.

(2) In the present disclosure, the plurality of reaction plates are spliced into the arc-shaped structure. The plurality of filler bags are arranged on each of the reaction plates to uniformly disperse the filler onto the reaction plates. Meanwhile, the curved swing plate swings back and forth on the opposite sides of the reaction plates and sprays the oxidant, which can enlarge a contact area between the oxidant in the decomplexing cavity and the reaction plates, so that the oxidant and the filler can fully react, thereby improving the efficiency of generating the sulfate radical with high oxidability and improving the decomplexing effect.

(3) In the present disclosure, the plurality of positive electrode plates and the plurality of negative electrode plates are staggered from each other in the electrode mounting barrel, so that it is equivalent that a plurality of electrolysis processes are performed simultaneously, which shortens the electrolysis time and greatly improves the efficiency of recycling heavy metals. Meanwhile, due to the arrangement of the spraying plates between the adjacent positive electrode plates and negative electrode plates, the reacted oxidant liquid in the mixing cavity is sprayed between the adjacent positive electrode plates and negative electrode plates to avoid local accumulation and increase the electrolytic reaction rate. Meanwhile, the first electric telescopic rods extend and contract to adjust spraying angles and spraying ranges of the respective spraying plates, which can uniformly spray the reacted oxidant liquid with different contents, and ensures the thoroughness of the electrolytic reaction and increases the recycling rate of the heavy metals. Since the second electric telescopic rod drives the plugging rod to slide up and down in the electrode mounting barrel, the spraying plates also synchronously slide. The spraying plates spray the reacted oxidant liquid at different depths into sewage, so that the reacted oxidant liquid fully contacts the sewage to increase the amount of recycled heavy metals in the sewage.

Figure 1:
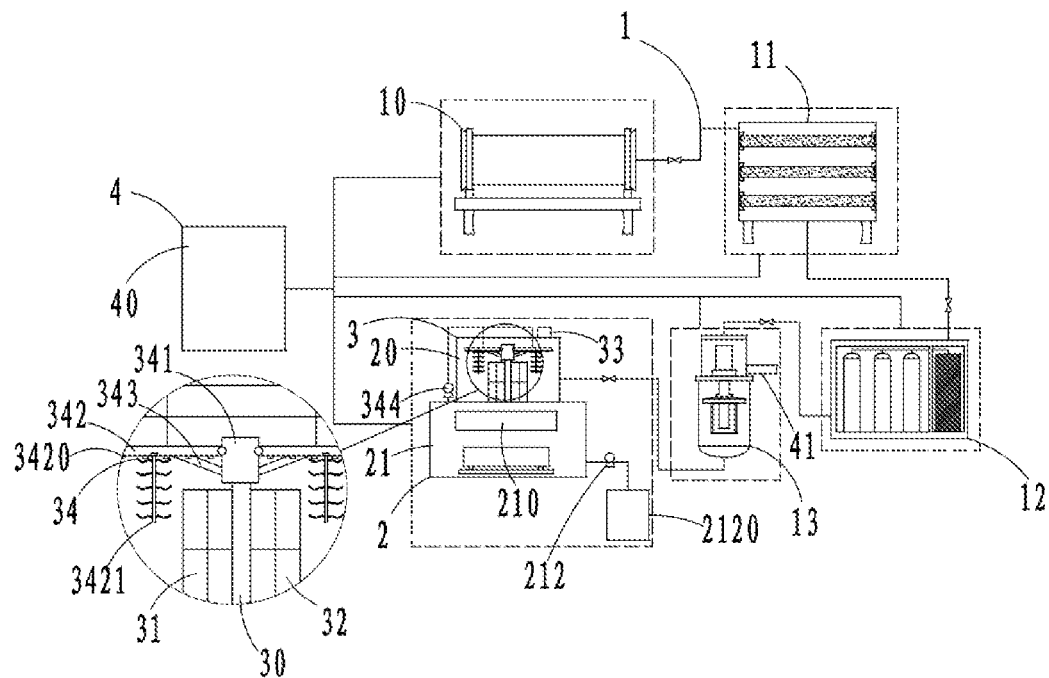
FIG. 1 is a schematic diagram of an entire structure of the present disclosure.

In the drawings: 1: wastewater separation and concentration component; 10: microfiltration treatment device; 11: nanofiltration treatment device; 12: reverse osmosis water purifier; 13: fresh water collection treatment device; 2: oxidization and decomplexing component; 20: decomplexing cavity; 21: mixing cavity; 210: reaction plate; 2100: mounting opening; 2101: filler bag; 211: curved swing plate; 2110: spraying hole; 2111: actuating frame; 2112: fixed plate; 2113: mounting seat; 2114: rotating shaft; 2115: V-shaped frame; 2116: mounting ring; 2117: clockwise and anticlockwise rotation motor; 212: first extraction pump; 2120: oxidant box; 213: through hole; 3: electrolytic recovery component; 30: electrode mounting barrel; 300: vertical sliding chute; 301: second electric telescopic rod; 31: positive electrode plate; 32: negative electrode plate; 320: inner-layer electrode plate; 321: inner-layer electrode plate protective shell; 322: barrier strip; 323: carbon-based reduction patch; 33: direct current power supply; 34: liquid spraying component; 340: plugging rod; 341: adjustment sleeve; 3410: T-shaped clamping column; 342: spraying plate; 3420: spraying opening; 3421: vertical stirring roller; 3422: micro motor; 343: first electric telescopic rod; 344: second extraction pump; 4: intelligent detection component; 40: controller; and 41: water quality detector.

DETAILED DESCRIPTION OF THE EMBODIMENTS

In order to further understand the content of the present disclosure, the present disclosure will be described in detail below in combination with embodiments.

Embodiment 1

Figure 2:
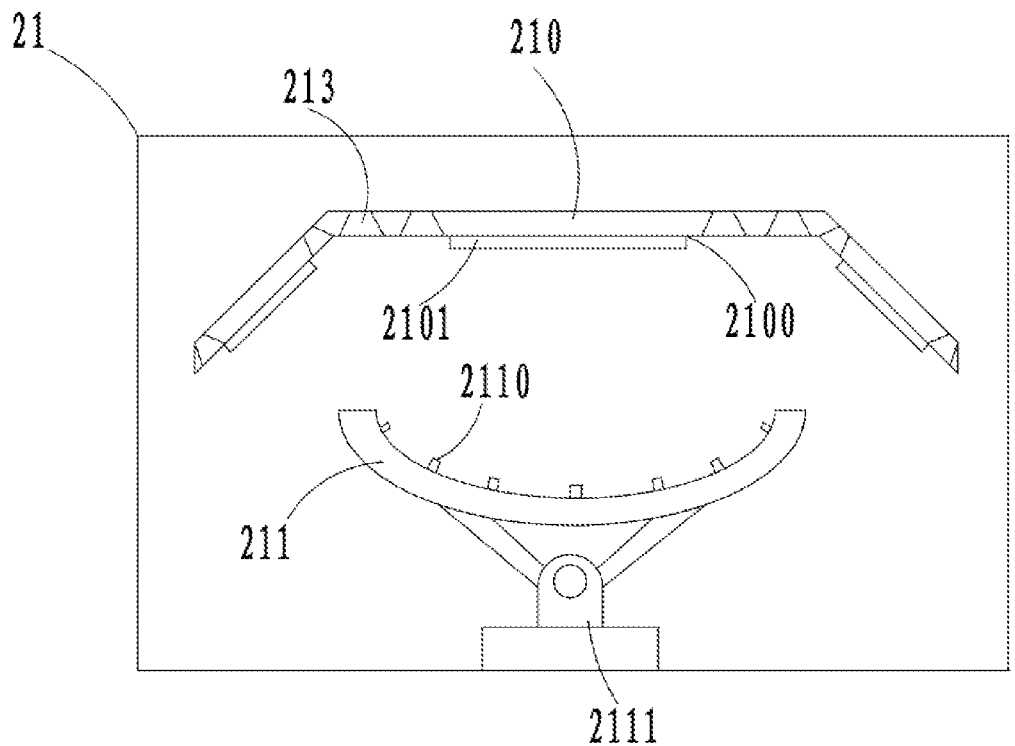
FIG. 2 is a top view of a mixing cavity of the present disclosure.

As shown in FIG. 1 and FIG. 2, recycling treatment equipment for recycling heavy metals from complexed heavy metal wastewater includes a wastewater separation and concentration component 1, an oxidization and decomplexing component 2, an electrolytic recovery component 3, and an intelligent detection component 4.

The wastewater separation and concentration component 1 includes a microfiltration treatment device 10 for performing microfiltration on the complexed heavy metal wastewater, a nanofiltration treatment device 11 for performing nanofiltration on concentrated water treated by the microfiltration treatment device 10, a reverse osmosis water purifier 12 for performing reverse osmosis purification on concentrated water treated by the nanofiltration treatment device 11, and a fresh water collection treatment device 13 for purifying fresh water treated by the microfiltration treatment device 10, the nanofiltration treatment device 11, and the reverse osmosis water purifier 12.

The oxidization and decomplexing component 2 includes a decomplexing cavity 20 communicated with the fresh water collection treatment device 13, and a mixing cavity 21 communicated with the decomplexing cavity 20; the mixing cavity 21 is internally provided with a reaction plate 210; three mounting openings 2100 are uniformly formed in a side wall of the reaction plate 210; each of the mounting openings 2100 is filled with a filler bag 2101; a curved swing plate 211 is arranged at a position, opposite to the reaction plate 210, in the mixing cavity 21; the curved swing plate 211 is connected with an oxidant box 2120 through a first extraction pump 212; 24 spraying holes 2110 are formed in a side wall, opposite the reaction plate 210, on the curved swing plate 211; and an actuating frame 2111 for controlling the curved swing plate 211 to swing left and right is arranged at a bottom end of the curved swing plate 211.

Figure 4:
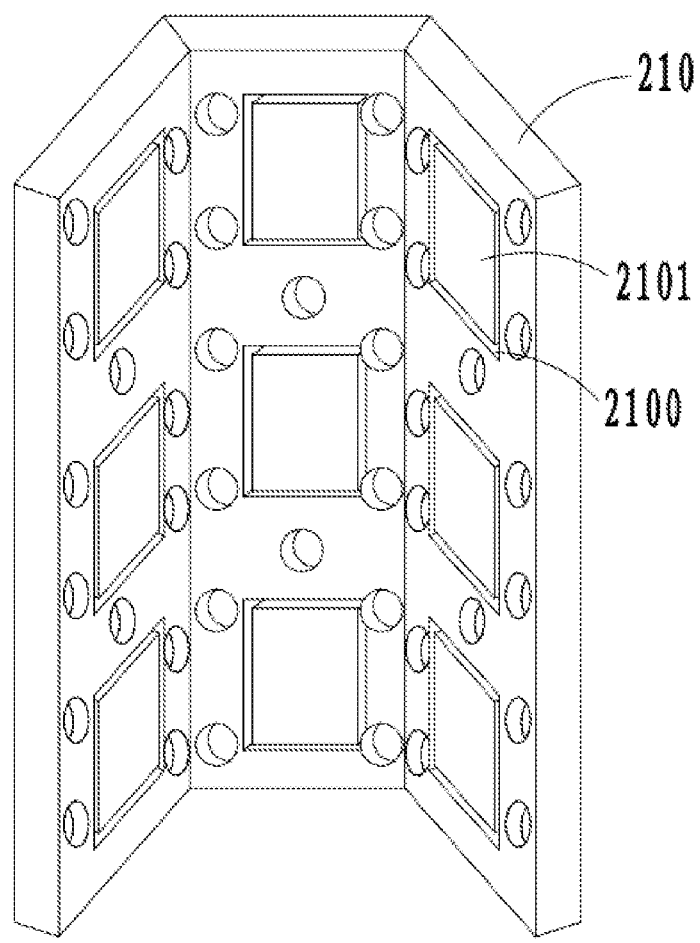
FIG. 4 is a schematic structural diagram of a reaction plate of the present disclosure.

As shown in FIG. 2 and FIG. 4, there are three reaction plates 210. The three reaction plates 210 are spliced in sequence into an arc-shaped structure. 14 through holes 213 are uniformly formed in an outer wall of each of the reaction plates 210. A cross section of each of the through holes 213 is of an isosceles trapezoid structure.

Figure 3:
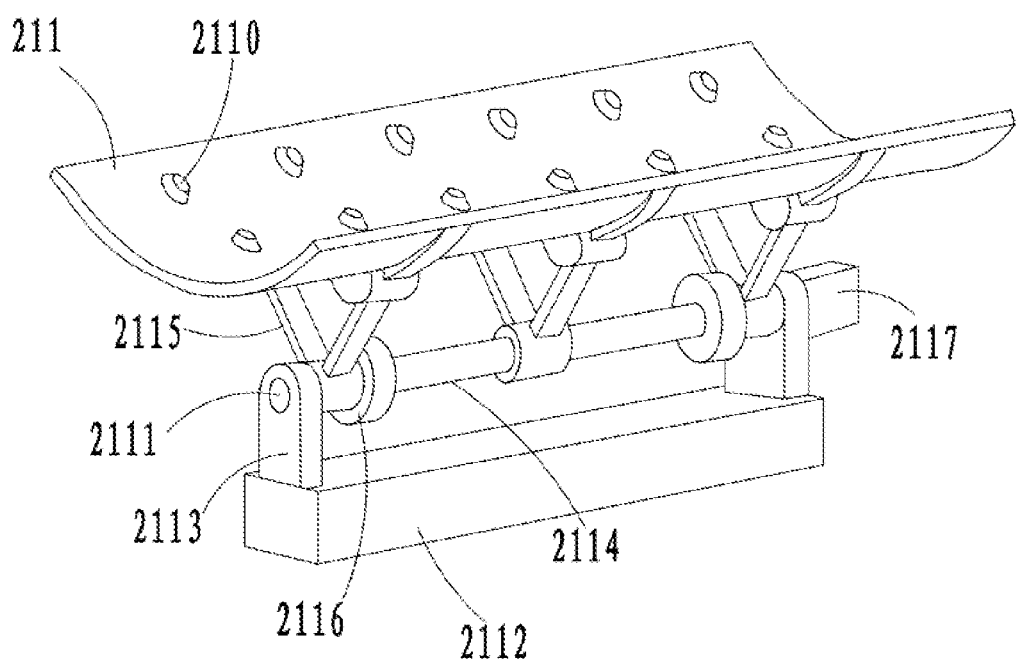
FIG. 3 is a schematic structural diagram of connection between a curved swing plate and an actuating frame of the present disclosure.

As shown in FIG. 3, the actuating frame 2111 includes a fixed plate 2112 arranged at an inner bottom end of the mixing cavity 21, a mounting seat 2113 arranged horizontally at an upper end of the fixed plate 2112, a rotating shaft 2114 arranged horizontally at an upper end of the mounting seat 2113, a mounting ring 2116 sleeving an outer wall of the rotating shaft 2114 and connected to a bottom end of the curved swing plate 211 through a V-shaped frame 2115, and a clockwise and anticlockwise rotation motor 2117 for driving the rotating shaft 2114 to rotate.

A filler in the filler bag 2101 is ceramsite loaded with transition metals Ni, Mn, and Fe, and an oxidant in the oxidant box 2110 is liquid persulfate.

Figure 5:
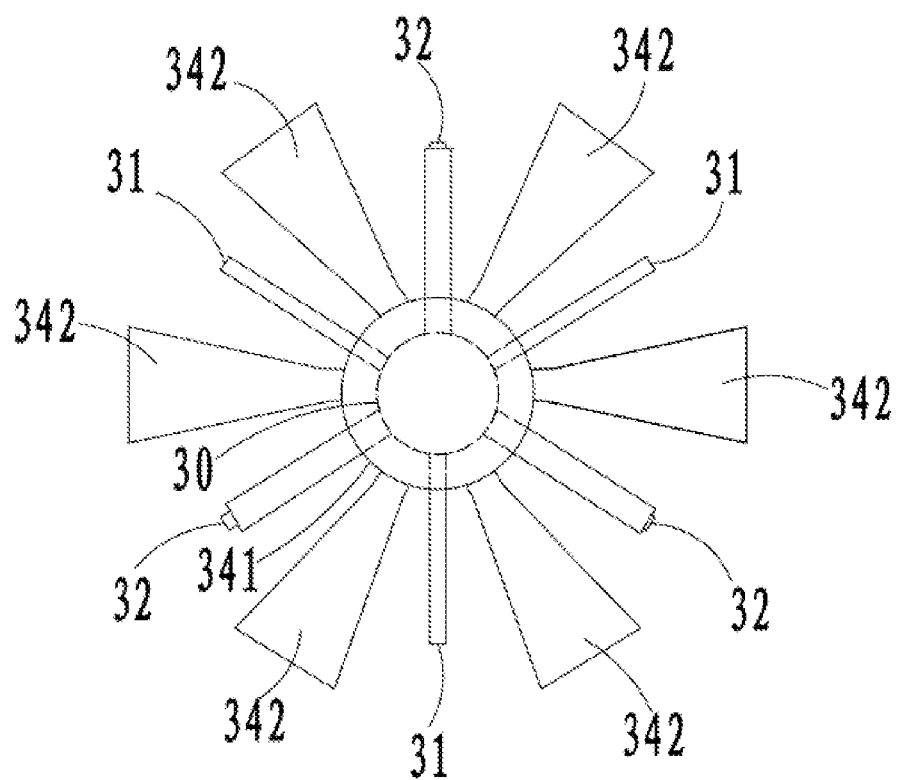
FIG. 5 is a top view of mounting of spraying plates on an electrode mounting barrel of the present disclosure.

As shown in FIG. 1 and FIG. 5, the electrolytic recovery component 3 includes an electrode mounting barrel 30 arranged vertically in the decomplexing cavity 20, three positive electrode plates 31 arranged on an outer wall of the electrode mounting barrel 30, three negative electrode plates 32 arranged between two adjacent positive electrode plates 31, and a direct current power supply 33 electrically connected to the respective positive electrode plates 31 and the respective negative electrode plates 32; each of the negative electrode plates 32 includes an inner-layer electrode plate 320 and an inner-layer electrode plate protective shell 321 covered on an outer wall of the inner-layer electrode plate 320; four barrier strips 323 in grid distribution are arranged on an outer wall of the inner-layer electrode plate protective shell 321: a carbon-based reduction patch 322 is arranged in a grid region; the intelligent detection component 4 includes a controller 40 electrically connected to the microfiltration treatment device 10, the nanofiltration treatment device 11, the fresh water collection treatment device 13, the first extraction pump 212, the positive electrode plates 31, and the negative electrode plates 32, and a water quality detector 41 used for detecting water quality in the fresh water collection treatment device 13.

Embodiment 2

Figure 6:
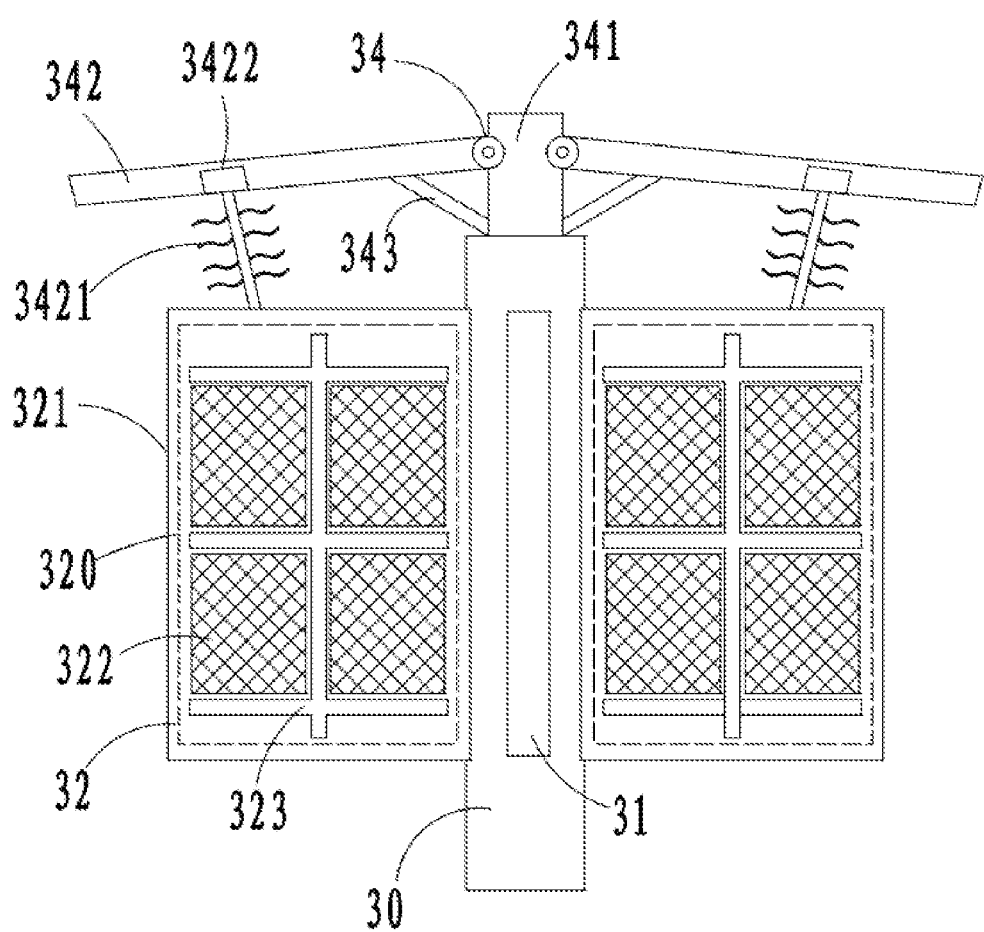
FIG. 6 is a front view of mounting of spraying plates on an electrode mounting barrel of the present disclosure.
Figure 7:
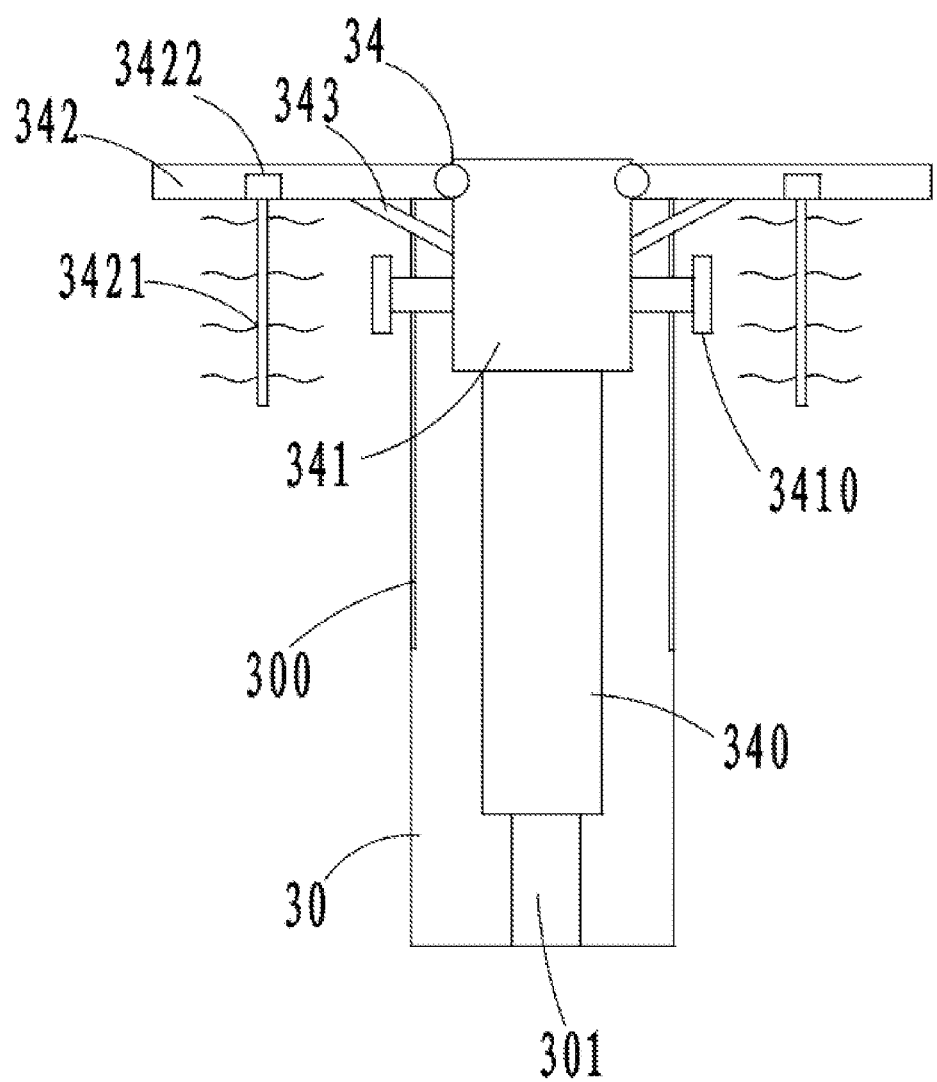
FIG. 7 is a schematic diagram of connection between a liquid spraying component and an electrode mounting barrel of the present disclosure.

A difference between this embodiment and Embodiment 1 is as follows:

As shown in FIG. 1, FIG. 6, and FIG. 7, a liquid spraying component 34 is arranged at an upper end of the electrode mounting barrel 30; the liquid spraying component 34 includes a plugging rod 340 with a bottom end plugged into the electrode mounting barrel 30, an adjustment sleeve 341 arranged at a top end of the plugging rod 340 and capable of sliding up and down along an outer wall of the plugging rod 340, a spraying plate 342 distributed circumferentially on an outer wall of the adjustment sleeve 341 and having one end hinged to the outer wall of the adjustment sleeve 341, and six first electric telescopic rods 343 arranged between the adjustment sleeve 341 and the spraying plate 342; the respective spraying plates 342 are connected to the mixing cavity 21 through connecting pipes, and second extraction pumps 344 are arranged at joints; and 15 spraying openings 3420 are uniformly formed in a bottom end of each of the spraying plates 342.

As shown in FIG. 5, the spraying plates 342 are located between the adjacent positive electrode plates 31 and negative electrode plates 32; vertical sliding chutes 300 in one-to-one correspondence to the spraying plates 342 are arranged on the outer wall of the electrode mounting barrel 30; six T-shaped clamping columns 3410 capable of sliding up and down along the vertical sliding chutes 300 are arranged on the outer wall of the adjustment sleeve 341; and a second electric telescopic rod 301 connected to the bottom end of the plugging rod 340 is arranged in the electrode mounting barrel 30.

A vertical stirring roller 3421 is arranged at a bottom of each of the spraying plates 342, and a top of the vertical stirring roller 3421 is connected with a micro motor 3422.

A use method of the recycling treatment equipment for recycling the heavy metals from the complexed heavy metal wastewater of Embodiment 2 specifically includes the following steps:

S1, wastewater containing complexed heavy metals are fed into the microfiltration treatment device 10 for microfiltration to obtain primary fresh water and primary concentrated water; then the obtained fresh water is fed into the nanofiltration treatment device 11 for nanofiltration to separate secondary fresh water and secondary concentrated water; the obtained secondary fresh water is fed into the reverse osmosis water purifier 12 for purification to obtain tertiary fresh water and tertiary concentrated water; finally, the tertiary fresh water is fed into the fresh water collection treatment device 13, and the water quality of the purified water is detected through the water quality detector 41; the purified water is recycled after it is detected that the water quality meets a treatment standard; the above primary concentrated water, secondary concentrated water and tertiary concentrated water are fed into the decomplexing cavity 20;

S2, the first extraction pump 212 is controlled to be started through the controller 40; the oxidant in the oxidant box 2120 is pumped into the curved swing plate 211; the rotating shaft 2114 is driven to rotate alternately clockwise and anticlockwise through the clockwise and anticlockwise rotation motor 2117 to drive the curved swing plate 211 to rotate in various angles along the reaction plates 210 and to spray the oxidant to the reaction plates 210 via the various spraying holes 2110, so that the oxidant fully contacts and reacts with the filler bags 2101 on the outer walls of the reaction plates 210 to generate liquid containing sulfate radicals with high oxidability, wherein the liquid is accumulated in the mixing cavity 21;

S3, when the wastewater in the decomplexing cavity 20 needs to be treated, the liquid containing the sulfate radicals with high oxidability in the mixing cavity 21 is pumped into the various spraying plates 342 through the second extraction pump 344, and the liquid is uniformly sprayed into the wastewater via the respective spraying openings 3420, so that metal ions are dissociated from a complexed state; meanwhile, the respective positive electrode plates 31 and the negative electrode plates 32 are powered on through the direct current power supply 33, wherein the carbon-based reduction patches 322 are arranged on the outer wall of the inner-layer electrode plate protective shell 321, the metal ions dissociated from the complexed state may be reduced on the negative electrode plates 32 and deposited on the negative electrode plates 32; after the metal ions in the solution are completely recycled, hydrogen ions in the water may be reduced into hydrogen and separated out; oxidation reaction may occur on the positive electrode plates 31 to generate tiny bubbles; and S4, in the above process, the spraying angles and spraying ranges of the respective spraying plates 342 are adjusted by extension and contraction of the first electric telescopic rods 343: the plugging rods 340 are driven to slide up and down in the electrode mounting barrel 30 through the second electric telescopic rod 301, which enables the spraying plates 342 to synchronously slide, to adjust spraying depths of the spraying plates 342; and the vertical stirring rollers 3421 are driven to perform stirring through the micro motor 3422 to improve the mixing uniformity of the reacted oxidant liquid and the sewage.

Test Case

The equipment in the prior art and the recycling treatment equipment of Embodiment 1 and Embodiment 2 were used to perform recycling treatment on wastewater containing complexed heavy metals, and heavy metals were recycled from the wastewater. Then, a heavy metal detection instrument was used to detect contents of various heavy metal elements in the wastewater before and after the treatment. Detection results obtained were as shown in Table 1 and Table 2:

TABLE 1

Contents of various heavy metal elements before treatment of wastewater containing complexed heavy metals

| | Percentage of heavy metal elements (mg/L) | | | |
| --- | --- | --- | --- | --- |
| | Cr | Sb | Cd | Ni |
| Wastewater containing complexed heavy metals | 0.8-0.9 | 3.5-5 | 0.3-0.5 | 0.7-0.95 |

TABLE 2

Contents of various heavy metal elements in wastewater containing complexed heavy metals treated by the equipment in the prior art and the recycling treatment equipment of Embodiment 1 and Embodiment 2

| | Percentage of heavy metal elements (mg/L) | | | |
| --- | --- | --- | --- | --- |
| | Cr | Sb | Cd | Ni |
| Prior art | 0.5 | 2.3 | 0.25 | 0.64 |
| Embodiment 1 | 0.001 | 0.015 | 0.05 | 0.017 |
| Embodiment 2 | 0 | 0.001 | 0.02 | 0 |

According to Table 1 and Table 2, it can be seen that after the equipment in the prior art was used to treat the wastewater containing the complexed heavy metals, a residual amount of Cr in the treated wastewater was 0.5 mg/L; a residual amount of Sb was 2.3 mg/L; a residual amount of Cd was 0.25 mg/L; and a residual amount of Ni was 0.64 mg/L. The residual amounts of the various heavy metal elements in the wastewater were significantly greater than the residual amounts of the heavy metals in the wastewater treated by the equipment in Embodiment 1 and Embodiment 2. That is, compared with the prior art, the recycling treatment equipment of Embodiment 1 and Embodiment 2 of the present disclosure has a higher recycling rate of the various heavy metal elements in the wastewater. Therefore, the performance of the recycling treatment equipment of Embodiment 1 and Embodiment 2 is better.

After the recycling treatment equipment in Embodiment 1 was used to treat the wastewater containing the complexed heavy metals, a residual amount of Cr in the treated wastewater was 0.001 mg/L; a residual amount of Sb was 0.015 mg/L; a residual amount of Cd was 0.05 mg/L: and a residual amount of Ni was 0.017 mg/L. After the recycling treatment equipment in Embodiment 2 was used to treat the wastewater containing the complexed heavy metals, a residual amount of Cr in the treated wastewater was 0 mg/L; a residual amount of Sb was 0.001 mg/L; a residual amount of Cd was 0.02 mg/L; and a residual amount of Ni was 0 mg/L. That is, compared with the recycling treatment equipment of Embodiment 1, the recycling treatment equipment of Embodiment 2 has a higher recycling rate of the various heavy metal elements in the wastewater. Therefore, Embodiment 2 is preferred.

The invention claimed is:

1. Recycling treatment equipment for recycling heavy metals from complexed heavy metal wastewater, comprising a wastewater separation and concentration component (1), an oxidization and decomplexing component (2), an electrolytic recovery component (3), and an intelligent detection component (4), wherein the wastewater separation and concentration component (1) comprises a microfiltration treatment device (10) for performing microfiltration on the complexed heavy metal wastewater, a nanofiltration treatment device (11) for performing nanofiltration on primary fresh water treated by the microfiltration treatment device (10), a reverse osmosis water purifier (12) for performing reverse osmosis purification on secondary fresh water treated by the nanofiltration treatment device (11), and a fresh water collection treatment device (13) for purifying tertiary fresh water treated by the reverse osmosis water purifier (12);

the oxidization and decomplexing component (2) comprises a decomplexing cavity (20) communicated with the fresh water collection treatment device (13), and a mixing cavity (21) communicated with the decomplexing cavity (20); the decomplexing cavity (20) treats primary concentrated water, secondary concentrated water, and tertiary concentrated water which are treated by the microfiltration treatment device (10), the nanofiltration treatment device (11), and the reverse osmosis water purifier (12); the mixing cavity (21) is internally provided with a reaction plate (210); a plurality of mounting openings (2100) are uniformly formed in a side wall of the reaction plate (210); each of the mounting openings (2100) is filled with a filler bag (2101); a curved swing plate (211) is arranged at a position, opposite to the reaction plate (210), in the mixing cavity (21); the curved swing plate (211) is connected with an oxidant box (2120) through a first extraction pump (212); a plurality of spraying holes (2110) are formed in a side wall, opposite the reaction plate (210), on the curved swing plate (211); an actuating frame (2111) for controlling the curved swing plate (211) to swing left and right is arranged at a bottom end of the curved swing plate (211);

the electrolytic recovery component (3) comprises an electrode mounting barrel (30) arranged vertically in the decomplexing cavity (20), at least one positive electrode plate (31) and at least one negative electrode plate (32) which is arranged on the electrode mounting barrel (30), and a direct current power supply (33) electrically connected to the at least one positive electrode plate (31) and the at least one negative electrode plate (32); the at least one negative electrode plate (32) comprises an inner-layer electrode plate (320) and an inner-layer electrode plate protective shell (321) covered on an outer wall of the inner-layer electrode plate (320); a carbon-based reduction patch (322) is arranged on an outer wall of the inner-layer electrode plate protective shell (321); the intelligent detection component (4) comprises a controller (40) electrically connected to the microfiltration treatment device (10), the nanofiltration treatment device (11), the fresh water collection treatment device (13), the first extraction pump (212), the at least one positive electrode plate (31), and the at least one negative electrode plate (32), and a water quality detector (41) used for detecting water quality in the fresh water collection treatment device (13).

2. The recycling treatment equipment for recycling the heavy metals from the complexed heavy metal wastewater according to claim 1, wherein the actuating frame (2111) comprises a fixed plate (2112) arranged at an inner bottom end of the mixing cavity (21), a mounting seat (2113) arranged horizontally at an upper end of the fixed plate (2112), a rotating shaft (2114) arranged horizontally at an upper end of the mounting seat (2113), a mounting ring (2116) sleeving an outer wall of the rotating shaft (2114) and connected to a bottom end of the curved swing plate (211) through a V-shaped frame (2115), and a clockwise and anticlockwise rotation motor (2117) for driving the rotating shaft (2114) to rotate.

3. The recycling treatment equipment for recycling the heavy metals from the complexed heavy metal wastewater according to claim 1, wherein there are a plurality of the reaction plates (210); the plurality of reaction plates (210) are spliced in sequence into an arc-shaped structure; a plurality of through holes (213) are uniformly formed in an outer wall of each of the reaction plates (210); and a cross section of each of the through holes (213) is of an isosceles trapezoid structure.

4. The recycling treatment equipment for recycling the heavy metals from the complexed heavy metal wastewater according to claim 1, wherein a filler in the filler bag (2101) is ceramsite loaded with transition metals, and an oxidant in the oxidant box (2120) is liquid persulfate.

5. The recycling treatment equipment for recycling the heavy metals from the complexed heavy metal wastewater according to claim 1, wherein the at least one positive electrode plate includes a plurality of positive electrode plates (31); the plurality of positive electrode plates (31) are uniformly arranged circumferentially on the outer wall of the electrode mounting barrel (30); the at least one negative electrode plate includes a plurality of negative electrode plates (32); and the plurality of negative electrode plates (32) are staggered from the plurality of positive electrode plates (31).

6. The recycling treatment equipment for recycling the heavy metals from the complexed heavy metal wastewater according to claim 1, wherein a plurality of barrier strips (323) in grid distribution are arranged on the outer wall of the inner-layer electrode plate protective shell (321); there are a plurality of carbon-based reduction patches (322); and the plurality of carbon-based reduction patches (322) are distributed in the above grid region.

7. The recycling treatment equipment for recycling the heavy metals from the complexed heavy metal wastewater according to claim 5, wherein a liquid spraying component (34) is arranged at an upper end of the electrode mounting barrel (30); the liquid spraying component (34) comprises a plugging rod (340) with a bottom end plugged into the electrode mounting barrel (30), an adjustment sleeve (341) arranged at a top end of the plugging rod (340) and capable of sliding up and down along an outer wall of the plugging rod (340), a spraying plate (342) distributed circumferentially on an outer wall of the adjustment sleeve (341) and having one end hinged to the outer wall of the adjustment sleeve (341), and a plurality of first electric telescopic rods (343) arranged between the adjustment sleeve (341) and the spraying plate (342); the respective spraying plates (342) are connected to the mixing cavity (21) through connecting pipes, and second extraction pumps (344) are arranged at joints; and a plurality of spraying openings (3420) are uniformly formed in a bottom end of each of the spraying plates (342).

8. The recycling treatment equipment for recycling the heavy metals from the complexed heavy metal wastewater according to claim 7, wherein the spraying plates (342) are located between the adjacent positive electrode plates (31) and negative electrode plates (32); vertical sliding chutes (300) in one-to-one correspondence to the spraying plates (342) are arranged on the outer wall of the electrode mounting barrel (30); a plurality of T-shaped clamping columns (3410) capable of sliding up and down along the vertical sliding chutes (300) are arranged on the outer wall of the adjustment sleeve (341) and a second electric telescopic rod (301) connected to the bottom end of the plugging rod (340) is arranged in the electrode mounting barrel (30).

9. The recycling treatment equipment for recycling the heavy metals from the complexed heavy metal wastewater according to claim 7, wherein a vertical stirring roller (3421) is arranged at the bottom end of each of the spraying plates (342), and a top of the vertical stirring roller (3421) is connected to a micro motor (3422).

* * * * *